Patented Jan. 16, ....

1,943,554

UNITED STATES PATENT OFFICE 1,943,554

QUARTZ PLATE FOR HALF-SHADE POLARIMETERS

Robert Richter, Jena, Germany, assignor to the firm Carl Zeiss, Jena, Germany

No Drawing. Application August 19, 1930, Serial No. 476,439, and in Germany September 11, 1929

2 Claims. (Cl. 88—14)

I have filed an application in Germany, September 11, 1929.

The present invention refers to the well-known quartz plate, system Laurent, which, for producing a variable half-shade in polarimeters, is so provided behind the polarizer that it covers part (generally one half) of the field of view. The Laurent plate is a plate of quartz, cut parallel to the crystal axis, of such a thickness that it displaces the ordinary ray of the yellow light of sodium vapour relatively to the extraordinary ray by an amount which is equal to an odd multiple of half the wave-length of the yellow sodium light. The least possible thickness of the quartz plate which makes the said displacement equal to one half wave-length is 0.03236 mm. Although, for optical reasons, it is desirable to have as thin a plate as possible, the quartz plate is usually given a greater thickness so as to afford it the necessary stability. It is the common practice to choose the elevenfold of the minimal thickness, that is to say, a thickness of plate of 0.356 mm.

Half-shade polarimeters with such plates have the drawback that they permit of being advantageously used only for yellow sodium light. When the light has another wave-length, the measuring accuracy is generally reduced, and, in case of wave-lengths with which the displacement of the ordinary ray relative to the extraordinary ray has a value which is exactly a whole multiple of the wave-length, the Laurent quartz plate is entirely ineffective. For example, when having a thickness of 0.356 mm., the said plate imparts the ordinary ray of the light of the green mercury line of a wave-length of 0.000546 mm., which, next to the sodium light is of special importance owing to its great intensity and purity, a displacement of twelve half wave-lengths relative to the extraordinary ray, which means that this light cannot be used.

According to the invention, however, the Laurent quartz plate can be given a suitable thickness which allows of using half-shadow polarimeters not only for light having the wavelength of the yellow sodium line but also for light of the green mercury line, and thus the range of application of these instruments is considerably extended. The minimal thickness of a Laurent quartz plate suiting the light of the said mercury line is 0.02977 mm. For this reason a Laurent quartz plate corresponding to the invention can be given such a thickness which approximately is at least an odd whole multiple of 0.03236 mm. and at the same time an odd whole multiple of 0.02977 mm. A suitable plate which specially comes up to these requirements and, without being too thick, also has a sufficient stability, has a thickness of 0.744 mm. A plate of this thickness gives the ordinary ray of the yellow sodium line a deflection of 23 half wave-lengths relative to the extraordinary ray and the ordinary ray of the said mercury line relative to the extraordinary ray a displacement of 25 half wave-lengths and for this reason suits the conditions of both kinds of light.

I claim:

1. A quartz plate, system Laurent, for halfshade polarimeters, having a thickness between 0.2 mm. and 1.0 mm., which at the same time is an odd multiple of 0.03236 mm. and of 0.02977 mm.

2. A quartz plate, system Laurent, for halfshade polarimeters, having a thickness not inferior to 0.74 mm. and not superior to 0.75 mm.

ROBERT RICHTER.